United States Patent
Cecchin et al.

(10) Patent No.: US 6,441,094 B1
(45) Date of Patent: Aug. 27, 2002

(54) IMPACT RESISTANT POLYOLEFIN COMPOSITIONS

(75) Inventors: Giuliano Cecchin, Ferrara; Anteo Pelliconi, Rovigo; Paola Sgarzi; Paolo Ferrari, both of Ferrara, all of (IT)

(73) Assignee: Baselltech USA Inc., Wilmington, DE (US)

( * ) Notice: Subject to any disclaimer, the term of this patent is extended or adjusted under 35 U.S.C. 154(b) by 0 days.

(21) Appl. No.: 09/831,712

(22) PCT Filed: Sep. 8, 2000

(86) PCT No.: PCT/EP00/08790

§ 371 (c)(1),
(2), (4) Date: May 14, 2001

(87) PCT Pub. No.: WO01/19915

PCT Pub. Date: Mar. 22, 2001

(30) Foreign Application Priority Data

Sep. 14, 1999 (EP) .............................. 99202974

(51) Int. Cl.$^7$ ........................... C08L 23/00; C08L 23/04
(52) U.S. Cl. ........................................ 525/191; 525/240
(58) Field of Search ................................. 525/191, 240

(56) References Cited

U.S. PATENT DOCUMENTS

| | | |
|---|---|---|
| 4,399,054 A | 8/1983 | Ferraris et al. |
| 4,472,524 A | 9/1984 | Albizzati ................... 502/113 |
| 5,210,139 A | 5/1993 | Huff et al. .................. 525/194 |
| 5,623,021 A * | 4/1997 | Pelliconi et al. ............ 525/240 |
| 6,395,832 B1 * | 5/2002 | Pelliconi et al. ............ 525/191 |

FOREIGN PATENT DOCUMENTS

| | | |
|---|---|---|
| EP | 0045977 | 2/1982 |
| EP | 0170255 | 2/1986 |
| EP | 0361493 | 4/1990 |
| EP | 0373660 | 6/1990 |
| EP | 0674991 | 10/1995 |
| EP | 0728769 | 8/1996 |
| EP | 0791630 | 8/1997 |

* cited by examiner

Primary Examiner—Nathan M. Nutter

(57) ABSTRACT

Polyolefin compositions comprising (percent by weight) A) 60%–95% of a crystalline polypropylene component having a Melt Flow Rate (MFR$^A$) value of from 2.5 to 50 g/10 min. and containing from 20% to 80% of a fraction A$^I$ having MFR$^I$ from 0.5 to 8 g/10 min., and from 20% to 80% of a fraction A$^{II}$); B) 5%–40% of a copolymer of ethylene with one or more $C_4$–$C_{10}$ α-olefin(s) containing from 10 to 40% of said $C_4$–$C_{10}$ α-olefin(s); the ratio MFR$^A$/MFR$^I$ being from 2 to 25; the percentages of A) and B) being referred to the sum of A) and B), and the percentages of A$^I$) and A$^{II}$ being referred to the sun of A$^I$) and A$^{II}$).

10 Claims, No Drawings

IMPACT RESISTANT POLYOLEFIN COMPOSITIONS

The present invention concerns polyolefin compositions comprising two polymer fractions with different Melt Flow Rate values, selected from propylene homopolymers and propylene-ethylene and/or other α-olefin random copolymers, and a copolymer of ethylene with $C_4$–$C_{10}$ α-olefins.

The compositions of the present invention present a unique balance of processability, mechanical properties and optical properties. In addition they present low/very low blush, reduced blooming and low content of fraction extractable in organic solvents. The said compositions can be easily processed by injection-molding and can be used for several applications, including housewares and toys, and in particular for food-contact applications.

Compositions comprising polypropylene and a rubbery phase formed by an elastomeric copolymer of ethylene with α-olefins are already known in the art, and described in particular in European patents 170 255 and 373 660. Said compositions present impact resistance and, in the case of European patent 373 660, transparency values interesting for many applications, however the overall balance of properties is still not totally satisfactory in view of the high standards required by the market. Therefore there is a strong demand for compositions of this kind with improved properties. Such a goal has now been achieved by the polyolefin compositions of the present invention, comprising (percent by weight):

A) 60%–95%, preferably 70%–90%, more preferably 70%–88%, of a crystalline polypropylene component having a Melt Flow Rate ($MFR^A$) value (measured at 230° C. with 2.16 Kg load) of from 2.5 to 50, preferably from 5 to 50, more preferably from 10 to 30 g/10 min., and containing from 20% to 80%, preferably from 40% to 60%, of a fraction $A^I$) having a Melt Flow Rate ($MFR^I$) value (measured at 230° C., with 2.16 Kg load) of from 0.5 to 8, preferably from 0.5 to 5, more preferably from 1 to 3 g/10 min., and from 20% to 80%, preferably from 40% to 60%, of a fraction $A^{II}$);

B) 5%–40%, preferably 10%–30%, more preferably 12%–30%, of a copolymer of ethylene with one or more $C_4$–$C_{10}$ α-olefin(s) containing from 10 to 40%, preferably from 15 to 30%, more preferably from 15 to 25%, of said $C_4$–$C_{10}$ α-olefin(s);

said fractions $A^I$) and $A^{II}$) being independently selected from propylene homopolymers and random copolymers of propylene containing up to 15%, preferably up to 10%, of ethylene and/or $C_4$–$C_{10}$ α-olefin(s); the ratio $MFR^A/MFR^I$ being from 2 to 25, preferably from 4 to 20; the percentages of A) and B) being referred to the sum of A) and B), and the percentages of $A^I$) and $A^{II}$) being referred to the sum of $A^I$) and $A^{II}$).

From the above definitions it is evident that the term "copolymer" includes polymers containing more than one kind of comonomers.

As previously said, the compositions of the present invention can be easily converted into various kinds of finished or semi-finished articles, in particular by using injection-molding techniques, as they possess relatively high values of MFR, associated with the said high balance of properties (in particular, of flexural modulus, impact resistance, ductile/brittle transition temperature, haze and gloss). The compositions of the present invention having values of MFR (230° C., 2.16 Kg) of the overall composition equal to or higher than 4 g/10 min., in particular equal to or higher than 5 g/10 min., are preferred.

The value of MFR of fraction $A^{II}$) ($MFR^{II}$) can be easily determined, on the basis of the above said ranges of $MFR^I$ and $MFR^A$ values, by means of the known correlation between the MFR of a polyolefin composition and the MFR of the separate components, which, in the present case, can be expressed as follows:

$$\ln MFR^A = (W_A^I/W_A^I + W_A^{II}) \times \ln MFR^I + (W_A^{II}/W_A^I + W_A^{II}) \times \ln MFR^{II}$$

wherein $W_A^I$ and $W_A^{II}$ represent the weight of fractions $A^I$) and $A^{II}$) respectively.

Other preferred features for the compositions of the present invention are:

content of comonomer or comonomers in each of fractions $A^I$) and $A^{II}$) when at least one of them is selected from propylene copolymers: 0.5 to 15%, more preferably 0.5 to 10%, in particular 0.5 to 8% (0.5 to 5% when only ethylene is present, 1 to 10%, in particular 1 to 8%, when only $C_4$–$C_{10}$ α-olefin(s) are present);

content of polymer insoluble in xylene at room temperature (23° C.) (substantially equivalent to the Isotacticity Index) for fractions $A^I$) and $A^{II}$): not less than 80%, more preferably not less than 85%, in particular not less than 90%, for propylene copolymers; not less than 90%, more preferably not less than 95%, in particular not less than 97%, for propylene homopolymers, said percentages being by weight and referred to a single fraction;

Polydispersity Index (PI) for A): equal to or higher than 4, in particular from 4 to 12;

Intrinsic Viscosity [η] of the fraction (of the overall composition) soluble in xylene at room temperature: 0.8 to 2.5 dl/g, more preferably, when high transparency is desired, 0.8 to 2, most preferably 0.8 to 1.9, in particular 0.8 to 1.5 dl/g.

The compositions of the present invention present at least one melt peak, determined by way of DSC (Differential Scanning Calorimetry), at a temperature higher than 140–145° C. Component B) of the said compositions generally presents a melt peak, determined by way of DSC, at a temperature in the range from 120° C. to 135° C. Such melt peak, which is attributable to a polyethylenic-type crystallinity, is generally detectable in the DSC pattern of the overall composition, particularly when component A) is made of propylene homopolymers.

Moreover, the compositions of the present invention preferably have:

a Flexural Modulus of at least 700 MPa, in particular from 700 to 1300 MPa, when at least one of fractions $A^I$) and $A^{II}$) is selected from propylene copolymers, or of at least 1200 MPa, more preferably at least 1400 MPa, in particular from 1400 or 1500 to 2000 MPa, when component A) is made of propylene homopolymers (i.e., both $A^I$) and $A^{II}$) are propylene homopolymers);

Izod values at 23° C. of at least 50 J/m, more preferably of at least 60 J/m in particular from 50 or 60 to 500 J/m;

tensile strength at yield: 15–38 MPa;

elongation at break: higher than 40%;

substantially no whitening (blush) when bending a plaque 1 mm thick;

fraction extractable in hexane (FDA 177, 1520): less than 10%, more preferably less than 9%, in particular less than 5.5% by weight;

fraction soluble in xylene at room temperature: less than 20%, more preferably less than 15%.

The Ductile/Brittle transition temperature and the optical properties (Haze and Gloss) are strongly dependent upon the Intrinsic Viscosity (I.V.) of the fraction (of the overall composition) soluble in xylene at room temperature.

The ductile/brittle transition temperature is lower the greater the said I.V. and is generally equal to or lower than −2° C., preferably equal to or lower than −5° C., more preferably equal to or lower than −10° C., the lower limit being indicatively of about −60° C.

Haze is lower the lower the said I.V. and is preferably lower than 30%, more preferably equal to or lower than 25%, for compositions wherein component A) is made of propylene homopolymers, equal to or lower than 20%, more preferably equal to or lower than 15%, for compositions wherein at least one of fractions A$^I$) and A$^{II}$) is selected from propylene copolymers. Said Haze values are measured on 1 mm thick plaques, prepared from nucleated compositions (in particular with dibenzylidene sorbitols).

Gloss is higher the lower the said I.V. and is preferably in the range from 30 to 150‰, more preferably from 40 to 130‰, measured in the same conditions as for Haze. It is therefore clear that in addition to the previously said preferred ranges of I.V. of the fraction soluble in xylene at room temperature, applicable when excellent optical properties are desired, another preferred range of said I.V. exists, namely from more than 1.5 to 2.5 dl/g, applicable when low ductile/brittle transition temperatures, and consequently improved impact resistance at low temperatures, are desired. In such range of I.V. the Haze values are generally in the range from 45 to 75%.

The compositions of the present invention are also characterized by reduced levels of blooming, as demonstrated by the fact that generally their Gloss values do not undergo a decrease of more than 30% under ageing (for instance after 9 days of ageing at 80° C.).

The said $C_4$–$C_{10}$ α-olefins, that are or may be present as comonomers in the components and fractions of the compositions of the present invention, are represented by the formula $CH_2$=CHR, wherein R is an alkyl radical, linear or branched, with 2–8 carbon atoms or an aryl (in particular phenyl) radical.

Examples of said $C_4$–$C_{10}$ α-olefins are 1-butene, 1-pentene, 1-hexene, 4-methyl-1-pentene and 1-octene. Particularly preferred is 1-butene.

The compositions of the present invention can be prepared by sequential polymerization in at least three polymerization steps. Such polymerization is carried out in the presence of stereospecific Ziegler-Natta catalysts. An essential component of said catalysts is a solid catalyst component comprising a titanium compound having at least one titanium-halogen bond, and an electron-donor compound, both supported on a magnesium halide in active form. Another essential component (co-catalyst) is an organoaluminum compound, such as an aluminum alkyl compound.

An external donor is optionally added.

The catalysts generally used in the process of the invention are capable of producing polypropylene with an Isotacticity Index greater than 90%, preferably greater than 95%. Moreover, said catalysts must have a sensitivity to molecular weight regulators (particularly hydrogen) high enough to produce polypropylene having MFR values from less than 1 g/10 min. to 100 g/10 min. or more.

Catalysts having the above mentioned characteristics are well known in the patent literature; particularly advantageous are the catalysts described in U.S. Pat. No. 4,399,054 and European patent 45977. Other examples can be found in U.S. Pat. No. 4,472,524.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids. Particularly suitable electron-donor compounds are phthalic acid esters, such as diisobutyl, dioctyl, diphenyl and benzylbutyl phthalate.

Other electron-donors particularly suitable are 1,3-diethers of formula:

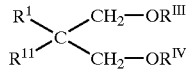

wherein $R^I$ and $R^{II}$ are the same or different and are $C_1$–$C_{18}$ alkyl, $C_3$–$C_{18}$ cycloalkyl or $C_7$–$C_{18}$ aryl radicals; $R^{III}$ and $R^{IV}$ are the same or different and are $C_1$–$C_4$ alkyl radicals; or are the 1,3-diethers in which the carbon atom in position 2 belongs to a cyclic or polycyclic structure made up of 5, 6 or 7 carbon atoms and containing two or three unsaturations. Ethers of this type are described in published European patent applications 361493 and 728769.

Representative examples of said dieters are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, 9,9-bis (methoxymethyl) fluorene.

The preparation of the above mentioned catalyst components is carried out according to various methods.

For example, a $MgCl_2 \cdot nROH$ adduct (in particular in the form of spheroidal particles) wherein n is generally from 1 to 3 and ROH is ethanol, butanol or isobutanol, is reacted with an excess of $TiCl_4$ containing the electron-donor compound. The reaction temperature is generally from 80 to 120° C. The solid is then isolated and reacted once more with $TiCl_4$, in the presence or absence of the electron-donor compound, after which it is separated and washed with aliquots of a hydrocarbon until all chlorine ions have disappeared.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide.

The titanium compounds which can be used for the preparation of the solid catalyst component are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The active form of magnesium halide in the solid catalyst component can be recognized by the fact that in the X-ray spectrum of the catalyst component the maximum intensity reflection appearing in the spectrum of the nonactivated magnesium halide (having a surface area smaller than 3 $m^2$/g) is no longer present, but in its place there is a halo with the maximum intensity shifted with respect to the position of the maximum intensity reflection of the nonactivated magnesium dihalide, or by the fact that the maximum intensity reflection shows a width at half-peak at least 30% greater than the one of the maximum intensity reflection which appears in the spectrum of the nonactivated magnesium halide. The most active forms are those where the above mentioned halo appears in the X-ray spectrum of the solid catalyst component.

Among magnesium halides, the magnesium chloride is preferred. In the case of the most active forms of magnesium chloride, the X-ray spectrum of the solid catalyst component shows a halo instead of the reflection which in the spectrum of the nonactivated chloride appears at 2.56 Å.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups. The Al-alkyl compound is generally used in such a quantity that the Al/Ti ratio be from 1 to 1000.

The electron-donor compounds that can be used as external donors include aromatic acid esters such as alkyl benzoates, and in particular silicon compounds containing at least one Si- OR bond, where R is a hydrocarbon radical.

Examples of silicon compounds are (tert-butyl)$_2$ Si (OCH$_3$)$_2$, (cyclohexyl) (methyl) Si (OCH$_3$)$_2$, (phenyl)$_2$ Si (OCH$_3$)$_2$ and (cyclopentyl)$_2$ Si (OCH$_3$)$_2$. 1,3-diethers having formulae described above can also be used advantageously. If the internal donor is one of these dieters, the external donors can be omitted.

As previously said, the polymerization process can be carried out in at least three sequential steps, wherein components A) and B) are prepared in separate subsequent steps, operating in each step, except the first step, in the presence of the polymer formed and the catalyst used in the preceding step. The catalyst is added only in the first step, however its activity is such that it is still active for all the subsequent steps.

Component A) is preferably prepared before component B).

In at least two (preferably consecutive) polymerization steps the relevant monomer(s) are polymerized to form fractions AI) and AII) and in the other step(s) a mixture of ethylene and the $C_4$–$C_{10}$ α-olefin(s) is polymerized to form component B). Preferably, fraction $A^I$) is prepared before fraction $A^{II}$).

The regulation of the molecular weight is carried out by using known regulators, hydrogen in particular.

By properly dosing the concentration of the molecular weight regulator in the relevant steps, the previously described MFR and [η] values are obtained.

The whole polymerization process, which can be continuous or batch, is carried out following known techniques and operating in liquid phase, in the presence or not of inert diluent, or in gas phase, or by mixed liquid-gas techniques. It is preferable to carry out the polymerization in gas phase. However it is possible to carry out the propylene (co) polymerization steps using liquid propylene as diluent, and the other polymerization step(s) in gas phase. Generally there is no need for intermediate steps except for the degassing of unreacted monomers.

Reaction time, pressure and temperature relative to the two steps are not critical, however it is best if the temperature is from 20 to 100° C. The pressure can be atmospheric or higher. The catalysts can be pre-contacted with small amounts of olefins (prepolymerization). The compositions of the present invention can also be obtained by preparing separately the said components A) and B) or even fractions $A^I$), $A^{II}$) and component B), by operating with the same catalysts and substantially under the same polymerization conditions as previously explained (except that a wholly sequential polymerization process will not be carried out, but the said components and fractions will be prepared in separate polymerization steps) and then mechanically blending said components and fractions in the molten or softened state. Conventional mixing apparatuses, like screw extrudres, in particular twin screw extruders, can be used.

The compositions of the present invention can also contain additives commonly employed in the art, such as antioxidants, light stabilizers, heat stabilizers, nucleating agents, colorants and fillers.

In particular, the addition of nucleating agents brings about a considerable improvement in important physical-mechanical properties, such as Flexural Modulus, Heat Distortion Temperature (HDT), tensile strength at yield and transparency.

Typical examples of nucleating agents are the p-tert.-butyl benzoate and the 1,3- and 2,4-dibenzylidenesorbitols.

The nucleating agents are preferably added to the compositions of the present invention in quantities ranging from 0.05 to 2% by weight, more preferably from 0.1 to 1% by weight with respect to the total weight.

The addition of inorganic fillers, such as talc, calcium carbonate and mineral fibers, also brings about an improvement to some mechanical properties, such as Flexural Modulus and HDT. Talc can also have a nucleating effect.

The particulars are given in the following examples, which are given to illustrate, without limiting, the present invention.

EXAMPLES 1–4

In the following examples polyolefin compositions according to the present invention are prepared by sequential polymerization.

The solid catalyst component used in polymerization is a highly stereospecific Ziegler-Natta catalyst component supported on magnesium chloride, containing about 2.5% by weight of titanium and diisobutylphthalate as internal donor, prepared by analogy with the method described in the examples of European published patent application 674991.

Catalyst System and Prepolymerization Treatment

Before introducing it into the polymerization reactors, the solid catalyst component described above is contacted at –5° C. for 5 minutes with aluminum triethyl (TEAL) and dicyclopentyldimethoxysilane (DCPMS), in a TEAL/DCPMS weight ratio equal to about 4 and in such quantity that the TEAL/Ti molar ratio be equal to 65.

The catalyst system is then subjected to prepolymerization by maintaining it in suspension in liquid propylene at 20° C. for about 20 minutes before introducing it into the first polymerization reactor.

Polymerization

The polymerization is carried out in continuous in a series of three gas phase reactors equipped with devices for the transfer of the product coming from the reactor immediately preceding to the one immediately following.

In gas phase the hydrogen and the monomer(s) are analyzed in continuous and fed in such a manner that the desired concentration be maintained constant.

Into a first gas phase polymerization reactor a propylene homopolymer (Ex. 1–3) or propylene/ethylene copolymer (Ex. 4) is produced by feeding in a continuous and constant flow the prepolymerized catalyst system, hydrogen (used as molecular weight regulator) and propylene and ethylene monomers in the gas state, thus obtaining fraction $A^I$).

The polymer produced in the first reactor is discharged in the second reactor where a propylene homopolymer (Ex. 1–3) or propylene/ethylene copolymer (Ex. 4) is produced by feeding the monomer(s) and hydrogen in proper molar ratios, thus obtaining fraction $A^{II}$).

The polymer produced in the second reactor is discharged in a continuous flow and, after having been purged of unreacted monomers, is introduced in a continuous flow into the third gas phase reactor, together with quantitatively constant flows of hydrogen and ethylene and 1-butene monomers in the gas state. Component B) is thus obtained.

The polymer particles exiting the third reactor are subjected to a steam treatment to remove the reactive monomers and volatile substances, and then dried.

Polymerization conditions, molar ratio of the reactants and composition of the polymers obtained are shown in Table 1.

Then the polymer particles are introduced in a rotating drum, where they are mixed with 0.01% by weight of Irgafos 168 tris (2,4-di-tert-butylphenyl) phosphite, 0.05% by weight of Irganox 1010 pentaerythrityl-tetrakis [3-(3,5-di-tert-butyl4-hydroxy-phenyl)]propionate and 0. 16% by weight of Millad 3988 3,4-dimethylbenzylidene sorbitol.

Then the polymer particles are introduced in a twin screw extruder Berstorff ZE 25 (length/diameter ratio of screws: 33) and extruded under nitrogen atmosphere in the following conditions:

| | |
|---|---|
| Rotation speed: | 250 rpm; |
| Extruder output: | 6–20 kg/hour; |
| Melt temperature: | 200–250° C. |

The data relating to the final polymer compositions reported in Table 2 are obtained from measurements carried out on the so extruded polymers.

The data shown in the tables are obtained by using the following test methods.

Molar Ratios of the Feed Gases
Determined by gas-chromatography.
Ethylene and 1-butene Content of the Polymers
Determined by I.R. spectroscopy.
Melt Flow Rate MFR
Determined according to ASTM D 1238, condition L.
Xylene Soluble and Insoluble Fractions
Determined as follows.

2.5 g of polymer and 250 cm$^3$ of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 cm$^3$ of the filtered liquid is poured in a previously weighed aluminum container which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated. The percent by weight of polymer insoluble in xylene at room temperature is considered the Isotacticity Index of the polymer. This value corresponds substantially to the Isotacticity Index determined by extraction with boiling n-heptane, which by definition constitutes the Isotacticity Index of polypropylene.

Polydispersity Index (PI)
Accounts for the molecular weight distribution of the polymer. To determine the PI value, the modulus separation at low modulus value, e.g. 500 Pa, is determined at a temperature of 200° C. by using a RMS-800 parallel plates rheometer model marketed by Rheometrics (USA), operating at an oscillation frequency which increases from 0.01 rad/second to 100 rad/second. From the modulus separation value, the PI can be derived using the following equation:

$$PI = 54.6 \times (\text{modulus separation})^{-1.76}$$

wherein the modulus separation (MS) is defined as:

$$MS = (\text{frequency at } G' = 500 \text{ Pa})/(\text{frequency at } G'' = 500 \text{ Pa})$$

wherein G' is the storage modulus and G" is the low modulus.

Hexane Extractable Fraction
Determined according to FDA 177, 1520, by suspending in an excess of hexane a 100 μm thick film specimen of the composition being analyzed, in an autoclave at 50° C. for 2 hours. Then the hexane is removed by evaporation and the dried residue is weighed.

Intrinsic Viscosity (I.V.)
Determined in tetrahydronaphthalene at 135° C.
Melting Temperature (Tm) and Crystallization Temperature (Tc)
Determined by DSC (Differential Scanning Calorimetry).
Flexural Modulus
Determined according to ISO 178.
Tensile Strength at Yield
Determined according to ISO R 527.
Elongation at Yield
Determined according to ISO R 527.
Elongation at Break
Determined according to ISO R 527.
Izod Impact Strength (notched)
Determined according to ISO 180/1A
Ductile/Brittle Transition Temperature (D/B)
Determined according to internal method MA 17324, available upon request. According to this method, the bi-axial impact resistance is determined through impact with an automatic, computerised striking hammer.

The circular test specimens are obtained by cutting with circular hand punch (38 mm diameter). They are conditioned for at least 48 hours at 23° C. and 50 RH and then placed in a thermostatic bath at testing temperature for 1 hour.

The force-time curve is detected during impact of a striking hammer (5.3 kg, hemispheric punch with a ½" diameter) on a circular specimen resting on a ring support. The machine used is a CEAST 6758/000 type model no. 2.

D/B transition temperature means the temperature at which 50% of the samples undergoes fragile break when submitted to the said impact test.

Preparation of the Plaque Specimens
Plaques for D/B measurement, having dimensions of 127×127×1.5 mm are prepared according to internal method MA 17283; plaques for Haze measurement, 1 mm thick, are prepared by injection moulding according to internal method MA 17335 with injection time of 1 second, temperature of 230° C., mould temperature of 40° C.; plaques for gloss measurement, 1 mm thick, are prepared by injection moulding according to internal method MA 17335, with injection time of 3 seconds, temperature of 260° C., mould temperature of 40° C., description of all the said methods being available upon request.

Method MA 17283
The injection press is a Negri Bossi type (NB 90) with a clamping force of 90 tons. The mould is a rectangular plaque (127×127×1.5 mm).

The main process parameters are reported below:

| | |
|---|---|
| Back pressure (bar): | 20 |
| Injection time (s): | 3 |

| | |
|---|---|
| Maximum Injection pressure (MPa): | 14 |
| Hydraulic injection pressure (MPa): | 6–3 |
| First holding hydraulic pressure (MPa): | 4 ± 2 |
| First holding time (s): | 3 |
| Second holding hydraulic pressure (MPa): | 3 ± 2 |
| Second holding time (s): | 7 |
| Cooling time (s): | 20 |
| Mould temperature (° C.): | 60 |

Method MA 17335

The injection press is a Battenfeld type BA 500CD with a clamping force of 50 tons. The insert mould leads to the moulding of two plaques (55×60×1 mm each).

Preparation of the Film Specimens

Some films with a thickness of 50 μm are prepared by extruding each test composition in a single screw Collin extruder (length/diameter ratio of screw: 25) at a film drawing speed of 7 m/min. and a melt temperature of 210–250° C. Each resulting film is superimposed on a 1000 μm thick film of a propylene homopolymer having an isotacticity index of 97 and a MFR L of 2 g/10 min. The superimposed films are bonded to each other in a Carver press at 200° C. under a 9000 kg load, which is maintained for 5 minutes.

The resulting laminates are stretched longitudinally and transversally, i.e. biaxially, by a factor 6 with a TM Long film stretcher at 150° C., thus obtaining a 20 μm thick film (18 μm homopolymer+2 μm test composition). 2×5 cm specimens are cut from the films.

Haze on Plaque

Determined according to internal method MA 17270, available upon request. The plaques are conditioned for 24 hours at R.H. 50±5% and 23±1° C.

The apparatus used is a Hunter D25P-9 calorimeter. The measurement and computation principle are given in the norm ASTM-D1003.

The apparatus is calibrated without specimen, the calibration is checked with a haze standard. The haze measurement is carried out on five plaques.

Gloss on Plaque

Determined according to internal method MA 17021, available upon request. The photometer used is a Zehntner model ZGM 1020 or 1022 set with an incident angle of 60°. The measurement principle is given in the Norm ASTM D2457.

The apparatus calibration is done with a sample having a known gloss value. One gloss measure is obtained by the measurement on three plaques at two different locations on the same plaque.

Haze on Film

Determined on 50 μm thick films of the test composition, prepared as described above. The measurement is carried out on a 50×50 mm portion cut from the central zone of the film.

The instrument used for the test is a Gardner photometer with Haze-meter UX-10 equipped with a G.E. 1209 lamp and filter C. The instrument calibration is made by carrying out a measurement in the absence of the sample (0% Haze) and a measurement with intercepted light beam (100% Haze).

Gloss on Film

Determined on the same specimens as for the Haze.

The instrument used for the test is a model 1020 Zehntner photometer for incident measurements. The calibration is made by carrying out a measurement at incidence angle of 60° on black glass having a standard Gloss of 96.2% and a measurement at an incidence angle of 45° on black glass having a standard Gloss of 55.4%.

TABLE 1

| | EXAMPLES | | | |
|---|---|---|---|---|
| | 1 | 2 | 3 | 4 |
| 1st REACTOR | | | | |
| Temperature, ° C. | 70 | 80 | 80 | 80 |
| Pressure, Mpa | 1.8 | 1.8 | 1.8 | 1.8 |
| $H_2/C_3^-$, mol. | 0.01 | 0.001 | 0.001 | 0.002 |
| $C_2^-/C_3^- + C_3^-$, mol. | — | — | — | 0.019 |
| RESULTING POLYMER | | | | |
| Amount produced, % | 39 | 41 | 40 | 39 |
| $C_2^-$, % | — | — | — | 2.6 |
| MFR L, g/10min. | 2.3 | 1.2 | 1.2 | 1.2 |
| 2nd REACTOR | | | | |
| Temperature, ° C. | 70 | 80 | 80 | 80 |
| Pressure, Mpa | 1.8 | 1.8 | 1.8 | 1.8 |
| $H_2/C_3^-$, mol. | 0.23 | 0.439 | 0.63 | 0.419 |
| $C_2^-C_2^- + C^-$, mol. | — | — | — | 0.019 |
| RESULTING POLYMER | | | | |
| Amount produced, % | 40 | 41 | 40 | 39 |
| $C_2^-$ (total), % | — | — | — | 26 |
| MFR L (total), g/10 min. | 15 | 17 | 21 | 11.7 |
| X.I. (total), % | 98.7 | 98.7 | 98.3 | 96.5 |
| PI | 5.5 | 7.2 | 8.9 | 6.01 |
| 3rd REACTOR | | | | |
| Temperature, ° C. | 70 | 75 | 75 | 70 |
| Pressure, Mpa | 1.8 | 1.8 | 1.8 | 1.6 |
| $H_2/C_2^-$, mol. | 0.48 | 0.38 | 0.17 | 0.466 |
| $C_4^-C_2^- + C_4^-$ | 0.35 | 0.35 | 0.35 | 0.35 |
| TOTAL COMPOSITION | | | | |
| Amount produced, % | 21 | 18 | 20 | 22 |
| $C_2^-$,%, | 16.8 | 14.2 | 16.4 | 18.4 |
| $C_4^-$, % | 4.3 | 3.4 | 3.8 | 5.2 |
| MFR L, g/10 min. | 11.2 | 13.4 | 9.8 | 9.4 |
| X.S., % | 10.4 | 9.0 | 9.2 | 13.6 |
| H.E., % | — | 5.3 | 3.3 | 7.7 |
| $C_2^-$ in X.I., % | 10.6 | 10 | 12.4 | 13.3 |
| $C_4^-$ in X.I., % | <2 | <2 | <2 | <2 |
| I.V. of X.S., dl/g | 1.24 | 1.26 | 2.38 | 1.29 |

TABLE 2

| | EXAMPLES | | | |
|---|---|---|---|---|
| | 1 | 2 | 3 | 4 |
| Tm/Tc, ° C. | 162.6/ | 163.2/ | 162.4/ | 147.6/ |
| | 112.3 | 111.7 | 111.6 | 103.1 |
| Flexural Modulus, Mpa | 1630 | 1729 | 1770 | 1015 |
| Tensile strength at yield, Mpa | 32.5 | 36.1 | 32.4 | 25.2 |
| Elongation at break, % | 100 | 60 | 40 | 650 |
| Izod at 23° C., J/m | 135 | 70 | 80 | 190 |
| Izod at 0° C., J/m | 35 | 36 | 51 | 75 |
| Izod at −20° C., J/m | 23 | 26 | 43 | 38 |
| D/B, ° C. | −13 | −15 | −46 | −22 |
| Haze on plaque, % | 22.4 | 20.9 | 62.2 | 13.3 |
| Gloss on plaque, % | 103.6 | 105.1 | 50.7 | 115.3 |
| Haze on film, % | 5.2 | 6.1 | 64.1 | 6.4 |
| Gloss on film, % | 72.6 | 70 | 11.4 | 71.5 |

Note to the Tables:

$C_2^-$=ethylene; $C_3^-$=propylene; $C_4^-$=1-butene; $C_2^-$(total)= ethylene content of polymer discharged from the specified reactor; Amount produced=amount of polymer produced in the specified reactor; X.I.=Xylene Insoluble fraction; X.I. (total)=X.I. of polymer discharged from the specified reactor; X.S.=Xylene Soluble fraction; H.E.=Hexane Extractable fraction: all percent amounts (except for elongations and Haze) are by weight.

What is claimed is:

1. Polyolefin compositions comprising (percent by weight):
   A) 60%–95% of a crystalline polypropylene component having a Melt Flow Rate ($MFR^A$) value (measured at 230° C., with 2.16 Kg load) of from 2.5 to 50 g/10 min. and containing from 20% to 80% of a fraction $A^I$) having a Melt Flow Rate ($MFR^I$) value (measured at 230° C., with 2.16 Kg load) of from 0.5 to 8 g/10 min., and from 20% to 80% of a fraction $A^{II}$);
   B) 5%–40% of a copolymer of ethylene with one or more $C_4$–$C_{10}$ α-olefin(s) containing from 10 to 40% of said $C_4$–$C_{10}$ α-olefin(s);
   said fractions $A^I$) and $A^{II}$) being independently selected from propylene homopolymers and random copolymers of propylene containing up to 15% of ethylene and/or $C_4$–$C_{10}$ α-olefin(s); the ratio $MFR^A/MFR^I$ being from 2 to 25; the percentages of A) and B) being referred to the sum of A) and B), and the percentages of $A^I$) and $A^{II}$) being referred to the sum of $A^I$) and $A^{II}$).

2. The polyolefin compositions of claim 1, having Melt Flow rate values (230° C., 2.16 Kg) equal to or higher than 4 g/10 min.

3. The polyolefin compositions of claim 1, wherein the intrinsic viscosity of the fraction soluble in xylene at room temperature is in the range from 0.8 to 2.5 dl/g.

4. The polyolefin compositions of claim 1, wherein the content of comonomer or comonomers in each of fractions $A^I$) and $A^{II}$), when at least one of them is selected from propylene copolymers, is in the range from 0.5 to 10% by weight.

5. The polyolefin compositions of claim 1, wherein the content of polymer soluble in xylene at room temperature in fractions $A^I$) and $A^{II}$) is not less than 80% for propylene copolymers or not less than 90% for propylene homopolymers (said percentages being by weight and referred to the weight of a single fraction).

6. The polyolefin compositions of claim 1, having a Ductile/Brittle transition temperature equal to or lower than −2° C.

7. A process for producing the polyolefin compositions of claim 1, carried out in at least three sequential steps, wherein in at least two polymerization steps the relevant monomer(s) are polymerized to form fractions $A^I$) and $A^{II}$) and in the other step(s) a mixture of ethylene and $C_4$–$C_{10}$ α-olefin(s) is polymerized to form component B), operating in each step, except the first step, in the presence of the polymer formed and the catalyst used in the preceding step.

8. The process of claim 7, wherein the polymerization catalyst is a stereospecific Ziegler-Natta catalyst comprising, as catalyst-forming components, a solid component comprising a titanium compound having at least one titanium-halogen bond and an electron-donor compound, both supported on a magnesium halide in active form, and an organoaluminum compound.

9. The process of claim 7, wherein all the polymerization steps are carried out in gas phase.

10. The process of claim 7, wherein the propylene (co) polymerization steps are carried out using liquid propylene as diluent, and the other polymerization step(s) are carried out in gas phase.

* * * * *